US006875388B2

(12) United States Patent
Trotter et al.

(10) Patent No.: US 6,875,388 B2
(45) Date of Patent: Apr. 5, 2005

(54) METHOD FOR MAKING A BALL AND SOCKET JOINT

(75) Inventors: Jason K. Trotter, Des Plaines, IL (US); Robert K. Dutzi, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 135 days.

(21) Appl. No.: 10/043,392

(22) Filed: Nov. 7, 2001

(65) Prior Publication Data

US 2003/0086753 A1 May 8, 2003

(51) Int. Cl.⁷ .................. B29C 45/14; B29C 65/70; B29C 70/84
(52) U.S. Cl. .............. 264/237; 264/234; 264/242; 264/250; 264/255; 264/261; 264/263; 264/275
(58) Field of Search .................. 264/234, 237, 264/242, 264, 250, 255, 261, 263, 267, 271.1, 274, 275, 259, 278; 403/122, 127, 128–131, 265, 267; 29/896.5, 898.043, 898.049, 898.052

(56) References Cited

U.S. PATENT DOCUMENTS

| | | | | |
|---|---|---|---|---|
| 3,904,731 A | * | 9/1975 | Orkin et al. ................. 264/242 |
| 4,290,181 A | * | 9/1981 | Jackson ........................ 29/458 |
| 4,325,904 A | * | 4/1982 | Frankhouse ................. 264/242 |
| 4,430,285 A | * | 2/1984 | Runyan et al. ............... 264/242 |
| 4,439,909 A | * | 4/1984 | Borgen et al. ................. 29/453 |
| 4,453,300 A | * | 6/1984 | Klimek et al. ......... 29/888.044 |
| 4,488,573 A | * | 12/1984 | Runyan et al. .............. 137/375 |
| 4,629,352 A | | 12/1986 | Nemoto ....................... 403/128 |
| 5,092,703 A | * | 3/1992 | Kobayashi ................... 403/122 |
| 5,484,218 A | | 1/1996 | Fellows ......................... 403/12 |
| 5,489,161 A | | 2/1996 | Sugita et al. ................ 403/134 |
| 5,492,427 A | | 2/1996 | Ersoy et al. ................... 403/77 |
| 5,492,428 A | | 2/1996 | Hellon et al. ................ 403/122 |
| 5,498,092 A | | 3/1996 | Fellows ......................... 403/12 |
| 5,551,722 A | | 9/1996 | Schwartz et al. ........... 280/689 |
| 5,568,930 A | | 10/1996 | Urbach ......................... 277/29 |
| 5,601,305 A | | 2/1997 | Nordloh et al. ............. 280/674 |
| 5,609,433 A | * | 3/1997 | Pazdirek et al. ............. 403/140 |
| 5,611,635 A | | 3/1997 | Schütt et al. ................ 403/141 |
| 5,615,967 A | | 4/1997 | Hellon ......................... 403/133 |
| 5,653,545 A | | 8/1997 | Moormann et al. ........... 403/50 |
| 5,672,023 A | | 9/1997 | Lieber et al. ................ 403/138 |
| 5,678,947 A | | 10/1997 | Urbach et al. ............... 403/288 |
| 5,713,689 A | | 2/1998 | Pazdirek et al. ............. 403/135 |
| 5,732,969 A | | 3/1998 | Spoto .......................... 280/689 |
| 5,752,780 A | | 5/1998 | Dorr ............................ 403/135 |
| 5,755,526 A | | 5/1998 | Stanevich .................... 403/122 |
| 5,782,573 A | | 7/1998 | Dorr et al. ................... 403/135 |
| 5,782,574 A | | 7/1998 | Henkel ......................... 403/135 |
| 5,813,698 A | | 9/1998 | Spoto et al. ................. 280/772 |
| 5,813,789 A | | 9/1998 | Prickler et al. .............. 403/135 |
| 5,836,606 A | | 11/1998 | Spoto et al. ................. 280/718 |
| 5,851,082 A | | 12/1998 | Schmudde et al. .......... 403/133 |

(Continued)

FOREIGN PATENT DOCUMENTS

| | | |
|---|---|---|
| DE | 199 21 107.8 | 1/2000 |
| GB | 976410 | 11/1964 |
| JP | 63154317 | 6/1988 |
| JP | 2000081025 | 3/2000 |

Primary Examiner—Angela Ortiz
(74) Attorney, Agent, or Firm—Fletcher Yoder

(57) ABSTRACT

A molding-in-place technique for joint assemblies, such as a ball joint. The technique is particularly well suited for molding "in-place" a linkage structure about a joint structure. The technique uses a molding assembly having a plurality of centering and sealing structures for sealingly centering the linkage structure about the joint structure. A desired mold material is injected between the linkage structure and the joint structure "in-place" to provide a self-toleranced, self-retained, molded-in-place joint assembly.

42 Claims, 4 Drawing Sheets

U.S. PATENT DOCUMENTS

| | | | |
|---|---|---|---|
| 5,860,757 A | 1/1999 | Sugiura | 403/131 |
| 5,876,149 A | 3/1999 | Dorr et al. | 403/134 |
| 5,882,137 A | 3/1999 | Epp et al. | 403/135 |
| 5,927,891 A | 7/1999 | Trumbower et al. | 403/114 |
| 5,931,597 A | 8/1999 | Urbach | 403/134 |
| 5,954,353 A | 9/1999 | Kincaid et al. | 280/124.152 |
| 6,007,079 A | 12/1999 | Kincaid et al. | 280/93.511 |
| 6,007,080 A | 12/1999 | Kincaid et al. | 280/124.152 |
| 6,010,271 A | 1/2000 | Jackson et al. | 403/131 |
| 6,010,272 A | 1/2000 | Littman | 403/131 |
| 6,030,141 A | 2/2000 | Lieber et al. | 403/135 |
| 6,038,771 A | 3/2000 | Takehara et al. | 29/897.2 |
| 6,042,294 A | 3/2000 | Urbach | 403/135 |
| 6,076,840 A | 6/2000 | Kincaid et al. | 280/124.107 |
| 6,098,287 A | 8/2000 | Takahashi et al. | 29/898.043 |
| 6,109,816 A * | 8/2000 | Iwasaki | 403/135 |
| 6,113,302 A | 9/2000 | Buhl | 403/133 |
| 6,116,113 A | 9/2000 | Pazdirek et al. | 74/579 R |
| 6,139,788 A * | 10/2000 | Dorr | 264/263 |
| 6,161,451 A | 12/2000 | Gleason, II | 74/579 R |
| 6,171,012 B1 | 1/2001 | Westphal | 403/137 |

\* cited by examiner

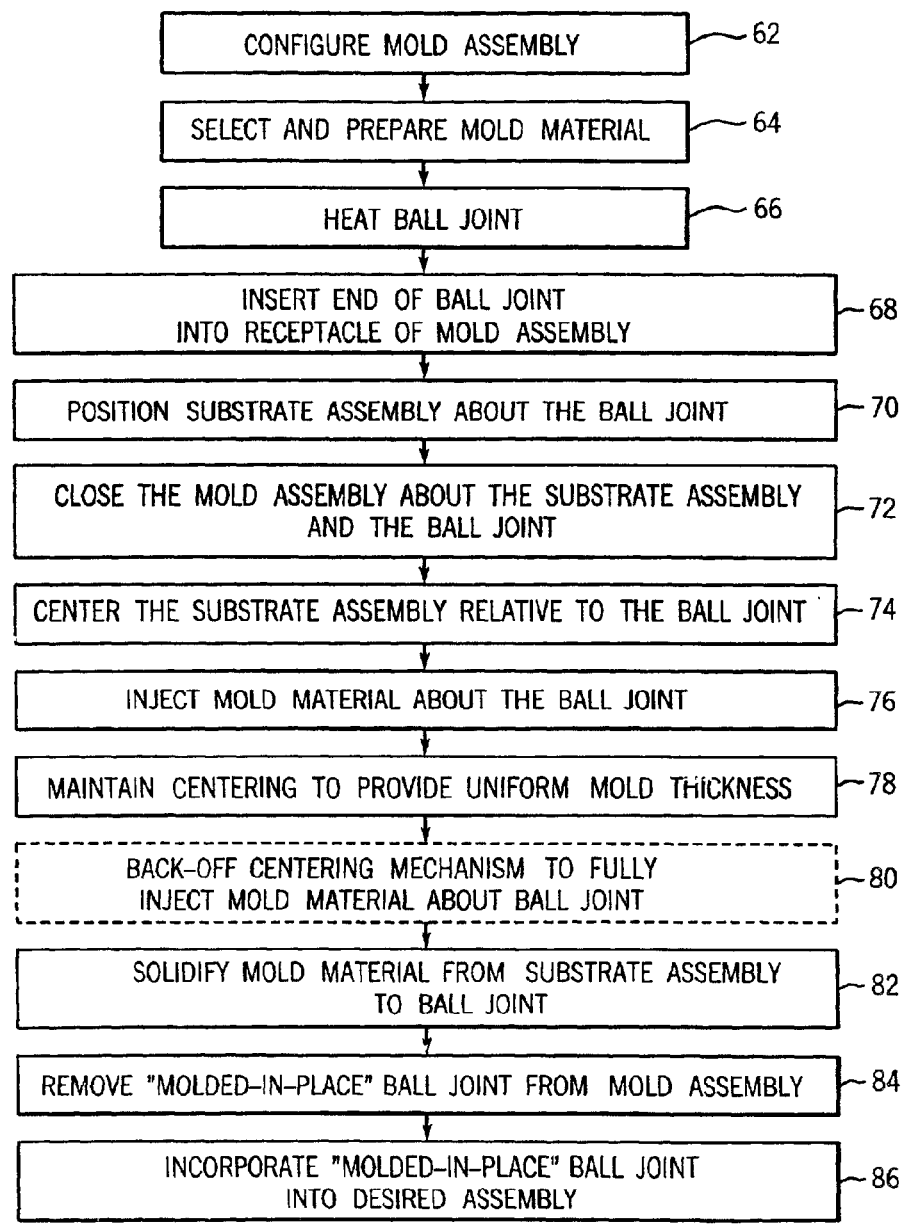

METHOD FOR MAKING A BALL AND SOCKET JOINT

BACKGROUND OF THE INVENTION

The present invention relates generally to the field of joint assemblies, and more particularly to movable joint assemblies, such as a ball joint. A molding-in-place technique is provided for molding a joint structure and surrounding linkage member in-place to form an integral, self-toleranced, self-retained, movable joint assembly for a desired application.

Existing joint assemblies typically comprises a ball and socket mechanism, which is formed by a multi-step process of forming a ball structure, forming a socket structure, and then assembling the ball structure and the socket structure. The ball structure is generally formed by a molding process or by molding a ball onto a stud or linkage. The socket structure is generally formed by a separate molding process, using the desired geometry of the ball structure as a basis for the geometry for the socket structure. Unfortunately, the multiple steps generally result in a poor fit between the ball and socket. For example, the dimensional variations between the ball and socket may result in a tighter or looser fit than desired.

There is a need, therefore, for an improved molding technique to improve the fit between the ball and socket and to prevent the problems caused by the dimensional variations between the ball and socket. Accordingly, it would be advantageous to mold the joint assembly in-place, thereby preventing the tolerance problems caused by the dimensional variations between the ball and socket.

SUMMARY OF THE INVENTION

The present technique provides a system and method for molding "in-place" a linkage structure about a joint structure. The technique uses a molding assembly having a plurality of centering and sealing structures for sealingly centering the linkage structure about the joint structure. A desired mold material is injected between the linkage structure and the joint structure "in-place" to provide a self-toleranced, self-retained, molded-in-place joint assembly.

In one aspect, the present technique provides a method of forming a mechanical joint. The method comprises molding a studded ball movably within a desired structure to form the mechanical joint. The studded ball is configured for coupling to a desired mechanical linkage.

In another aspect, the present technique provides a molding method for a mechanical joint. The method comprises injecting mold material into a cavity between a studded ball and a support structure for the studded ball. The method also comprises self-tolerancing the studded ball movably within the mold material.

In another aspect, the present technique provides a joint system. The system comprises a joint support structure and a studded joint member disposed within the joint support structure. The system also comprises a desired material molded-in-place about the studded joint member and internally retained within the joint support structure, wherein the studded joint member is movable and self-toleranced within the desired material.

In another aspect, the present technique provides a mold system for a ball joint assembly comprising a molding assembly configured to self-tolerance and mold-in-place the ball joint assembly. The molding assembly comprises a stud receptacle for a studded joint member, a first centering structure for the studded joint member, a second centering structure for a support structure disposed about the studded joint member, and a mold injection nozzle for injecting the desired mold material.

BRIEF DESCRIPTION OF THE DRAWINGS

The foregoing and other advantages of the invention will become apparent upon reading the following detailed description and upon reference to the drawings in which:

FIG. 2 is a flow chart of an exemplary molding process in accordance with the molding assembly illustrated in FIG. 1;

DETAILED DESCRIPTION OF SPECIFIC EMBODIMENTS

Figure 1:
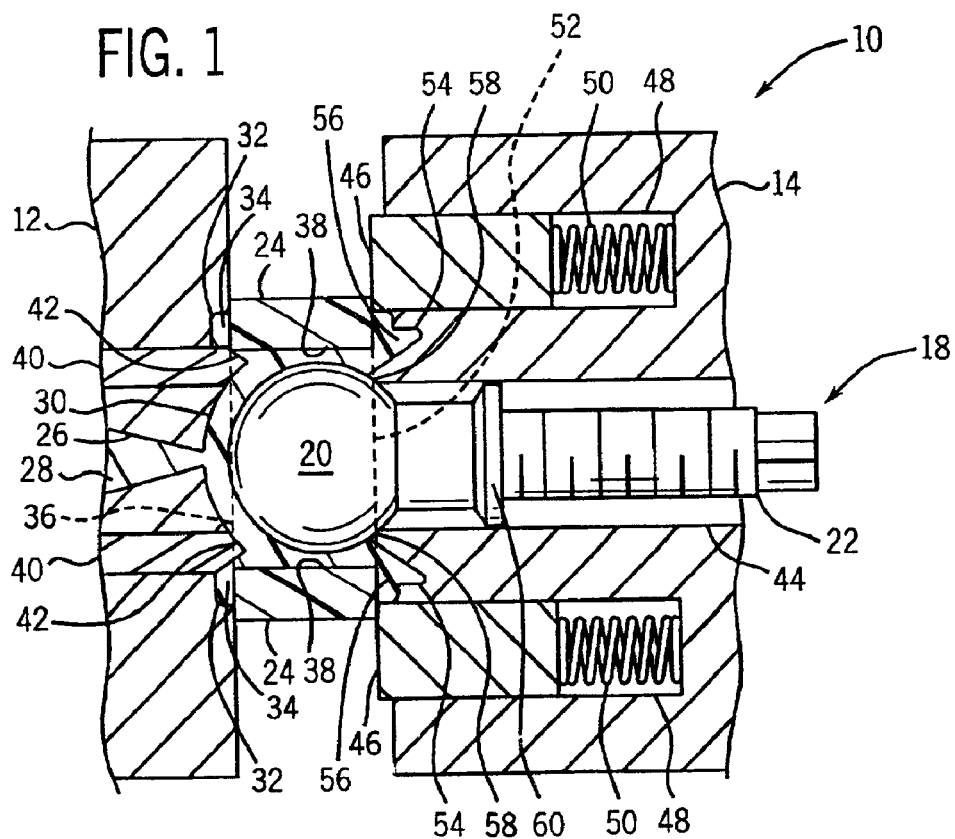
FIG. 1 is a cross-sectional view of an exemplary molding assembly configured to form a molded-in-place joint assembly.

Turning now to the drawings and referring first to FIG. 1, a molding system is illustrated in accordance with the present technique and designated generally by reference numeral 10. The molding system 10 comprises an injection section 12 and a securement section 14 configured to generate a molded-in-place joint assembly 16, which has a self-toleranced movable fit between the joint member and the mold material. The molding system 10 may be used to mold one or more materials (e.g., composite or layers) about the joint member and between the joint member and its support structure. The molding-in-place process can be performed on-site or off-site to generate the molded-in-place joint assembly 16 from a new or existing joint member and its support structure. For example, the system 10 can be applied to a fully or partially assembled or disassembled joint assembly, which may be fully or partially integrated or removed from the desired application.

As illustrated in FIG. 1, the molding system 10 comprises a variety of molding cavities and orientation members to mold a desired material uniformly around a joint member, such as a studded ball 18. Although a variety of geometries and linkages may be used within the scope of the present technique, the studded ball 18 illustrated in FIG. 1 has a ball member 20 coupled to a threaded stud 22. The ball member 20 may have a spherical geometry, an oval geometry, a pin-shaped geometry, a dimple texture, a plurality of flat surfaces forming a generally ball shaped member, or any other suitable geometry for a joint member. Similarly, the threaded stud 22 may comprise any suitable linkage mechanisms, such as threads, lateral receptacles for pins or bolts, a second ball member, or any other desired structures.

As illustrated, the injection and securement sections 12 and 14 are configured to seal and align desired mold geometries about the ball member 20 and a substrate assembly 24, which may have a variety of linkage and support structures for the molded-in-place joint assembly 16. For example, the substrate assembly may embody a collar that is symmetrically disposed about the ball member 20.

Figure 3:
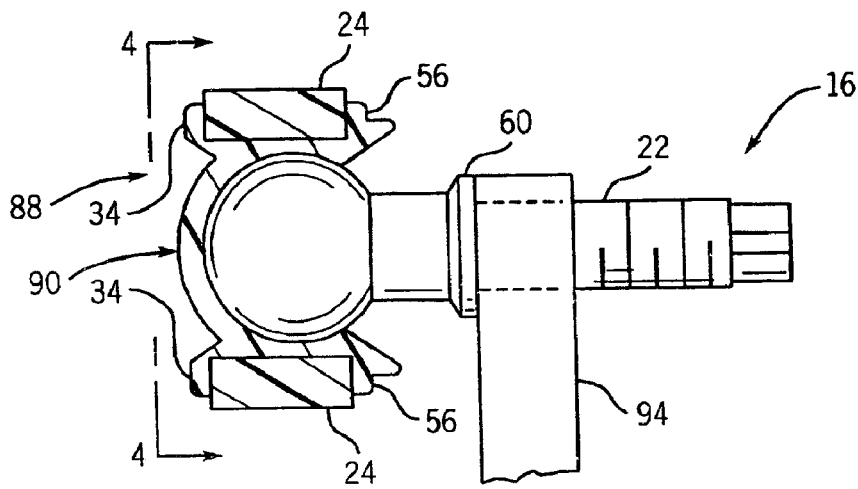
FIG. 3 is a cross-sectional view of the molded-in-place joint assembly formed by the molding assembly illustrated in FIG. 1.

The injection section 12 has an injection cavity 26 for injecting an injection material 28 through a curved mold portion 30. The injection material 28 may be any suitable mold material, such as a plastic or metallic substance. For example, a low friction material may be used to improve the bearing surface between the ball member 20 and the substrate assembly 24. The injection section 12 also has a mold portion 32 to form a retention structure 34 for securing the mold structure 90 in place around the ball member 20, as illustrated in FIG. 3. The mold portion 32 is disposed symmetrically about the substrate assembly 24 at an outer edge 36 of the substrate assembly 24. Alternatively, the molding system 10 may provide an internal retention structure along an inner surface 38 of the substrate assembly 24 (e.g., see FIGS. 5 and 6).

The injection section 12 also has orientation tabs 40 extending between the curved mold portion 30 and the mold portion 32. Each of these orientation tabs 40 has a forward edge 42 configured to contact the outer edge 36 of the substrate assembly 24. As the injection and securement sections 12 and 14 are disposed about the studded ball 18, the forward edges 42 contact and align the substrate assembly 24 about the ball member 20 to ensure a uniform and properly aligned mold. Any suitable number of orientation tabs 40 may be used to facilitate alignment. For example, three orientation tabs 40 may be symmetrically disposed about the injection cavity 26 (i.e., at 120 degrees apart). Accordingly, as illustrated in FIG. 1, the upper orientation tab 40 may represent a single orientation tab, while the lower orientation tab 40 may represent two orientation tabs disposed 120 degrees apart from one another and from the upper orientation tab 40.

The securement section 14 includes a central receptacle 44 for the studded ball 18 and a spring loaded collar(s) 46 disposed in a receptacle(s) 48 to provide a continuous seal between the substrate assembly 24 and the securement section 14. A spring assembly 50 is disposed in the receptacle 48 to provide a spring force for the spring-loaded collar 46, which may comprise a single symmetrical collar such as a ring-shaped collar. The spring-loaded collar 46 also accommodates any dimensional variations or tolerances in the substrate assembly 24 or various other components. The spring-loaded collar 46 is configured to contact an outer edge 52 of the substrate assembly 24 adjacent a mold portion 54, which is provided in the securement section 14 to form a retention structure 56 opposite the retention structure 34. As mentioned above, the molding system 10 may alternatively form an internal retention structure, such as along the internal surface 38 of the substrate assembly 24. The securement section 14 also has an alignment structure 58 disposed adjacent the mold portion 54. The alignment structure 58 is configured to contact the ball member 20 during molding and ensure proper alignment of the ball member 20 within the substrate assembly 24 and the injected material 28. The alignment structure 58 also forms a sealed mold geometry for the injection material 28 as the pressure of the injection material 28 forces the ball member 20 against the alignment structure 58. The molding system 10 also may utilize an alignment collar 60 on the studded ball 18 to facilitate alignment of the ball member 20 relative to the substrate assembly 38 and injection material 28.

FIG. 2 is an exemplary flow chart of a molding process afforded by the molding system 10 illustrated in FIG. 1. The operation of the molding system 10 is best illustrated with reference to the molding assembly illustrated in FIG. 1, the molding process illustrated in FIG. 2, and the molded-in-place joint assembly 16 illustrated in FIG. 3. As mentioned above, the molding system 10 may be utilized to mold-in-place a variety of joint mechanisms, including a ball joint, a pin joint, a bearing assembly with multiple joints, a socket assembly, or any other desired socket or bearing assembly. Accordingly, the molding system 10 may include configuring the mold assembly for the particular joint assembly (block 62 of FIG. 2). For example, the geometry of the curved mold portion 30, the mold portion 32, the mold portion 54, and the central receptacle 44 may be selected or modified for the geometry of the ball member 20 and the threaded stud 22. Moreover, the positioning of the foregoing mold portions 32 and 54 and the spring-loaded collar 46 may be modified for a particular geometry of the studded ball 18 and the substrate assembly 24. Further modifications also may be made for a different type of joint mechanism or socket assembly, as discussed above. After the suitable mold assembly has been selected, configured or designed, the molding system 10 may proceed to mold in place the desired joint mechanism or socket assembly.

The molding system 10 proceeds by selecting and preparing a mold material for the molding process (block 64 of FIG. 2). The mold material may comprise a plastic, a metal, or any other desired material. Preparation of the mold material may comprise a variety of processes, such as mixing components, heating the material, and coupling a source of the mold material to the injection cavity 26 of the injection section 12. In this exemplary embodiment of the molding system 10, the ball joint may be heated to create a temperature differential between the ball joint and the substrate assembly (block 66). For example, the ball joint may be heated to 300 degrees Fahrenheit, while the substrate assembly remains at room temperature (e.g., 70 degrees Fahrenheit). As discussed below, this temperature differential facilitates heat transfer from the ball joint to the substrate assembly, thereby preventing the mold material from shrinking onto and sticking to the surface of the ball joint. It should be noted that the mold material may be different from the material comprising the substrate or ball, or these may be made of the same material.

After the mold material has been selected and prepared (block 64) and the ball joint has been sufficiently heated (block 66), the ball joint is inserted into a receptacle of the mold assembly (block 68). For example, as illustrated in FIG. 1, the threaded stud 22 of the studded ball 18 is inserted into the central receptacle 44 of the securement section 14 of the mold assembly. The substrate assembly is then positioned about the ball joint adjacent the mold assembly (block 70). For example, as illustrated in FIG. 1, the substrate assembly 24 may be disposed about the ball member 20 and seated adjacent the spring loaded collar 46 of the securement section 14. The substrate assembly may embody an integral structure, such as a symmetrical or ring-shaped substrate assembly, or it may embody a plurality of substrate members to form a closed body about the ball joint. The molding system 10 then proceeds to close the mold assembly about the substrate assembly and the ball joint (block 70). For example, as illustrated in FIG. 1, the injection and securement sections 12 and 14 may be moved toward one another and seated against the outer edges 36 and 52 of the substrate assembly 24 to provide a sealed inner molding cavity for injection of the injection material 28 through the injection cavity 26 of the injection section 12.

The substrate assembly is then centered relative to the ball joint to ensure the desired mold thickness and orientation of the substrate assembly relative to the ball joint (block 72). For example, as illustrated in FIG. 1, the orientation tabs 40 interact with the outer edges 36 of the substrate assembly 24 to facilitate desired positioning of the substrate assembly 24. The spring-loaded collar 46 accommodates any dimensional variation in the substrate assembly 24 and other components of the molding system 10 to ensure a continuous seal between the molding assembly and the substrate assembly. Moreover, the alignment collar 60, fitted within receptacle 44, and the alignment structure 58 ensure proper alignment of the studded ball 18 and ball member 20. The injection and securement sections 12 and 14 also may be coupled to ensure that the foregoing alignment mechanisms cooperate to provide an overall alignment between the ball member 20 and the substrate assembly 24.

The molding system 10 then proceeds to inject mold material about the ball joint (block 76). For example, the injection material 28 may be injected through the injection cavity 26 and into the mold cavity between the substrate assembly 24 and the ball member 20. As illustrated in FIG. 1, the injection material 28 is injected toward the ball member 20 on an opposite side from the threaded stud 22, which is disposed in the central receptacle 44 of the securement section 14. The injection material 28 also may facilitate alignment as it pushes the ball member 20 against the alignment structure 58. The pressure of the injection material 28 preferably forces the ball member 20 against surface 58, thereby automatically sealing the mold cavity. Alternatively, the studded ball 18 may be pulled into the central receptacle 44 prior to injection of the injection material 28 to facilitate alignment against the alignment structure 58. In either case, the molding system 10 maintains the centering during mold injection to provide a uniform mold thickness (block 78). The mold material is injected into the mold cavity until the entire cavity is full, which may be determined by a volume or pressure sensor. If desired, the molding system 10 may then retract the centering mechanism to fully inject mold material about the ball joint (block 80). For example, the orientation tabs 40 illustrated in FIG. 1 may be backed away from the substrate assembly 24 to allow mold material to fill the gaps caused by the orientation tabs 40 (e.g., the gaps illustrated in FIG. 4).

The mold material may then be solidified between the substrate assembly and the ball joint (block 80). For example, the mold material may be allowed to solidify at room temperature, a coolant or cooler environment may be applied to the structure to accelerate cooling, or any other solidification step may be utilized within the scope of the molding system 10. It also should be noted that the temperature differential between the ball joint and the substrate assembly, as discussed above, facilitates solidification of the mold material. For example, the act of heating the ball joint ensures that the mold material solidifies from the substrate assembly inwardly toward the ball joint, thereby forming an insulative structure that keeps the mold material from contracting onto and sticking to the ball joint. In this manner, the substrate assembly essentially acts as a heat sink for the heated ball joint. Thus, the present technique helps reduce shrinkage of the mold material and it controls the tightness of the fit between the mold material and the ball joint. The result is a self-toleranced molded-in-place joint assembly, such as the molded-in-place joint assembly 16 illustrated in FIG. 3.

The molding system 10 then proceeds to remove the molded-in-place ball joint from the mold assembly (block 80). The molded-in-place ball joint may be further modified and refined or it may be immediately incorporated into a desired assembly (block 86). For example, the molded-in-place ball joint may be incorporated into a suspension system of a vehicle or any other movable joint application.

Figure 4:
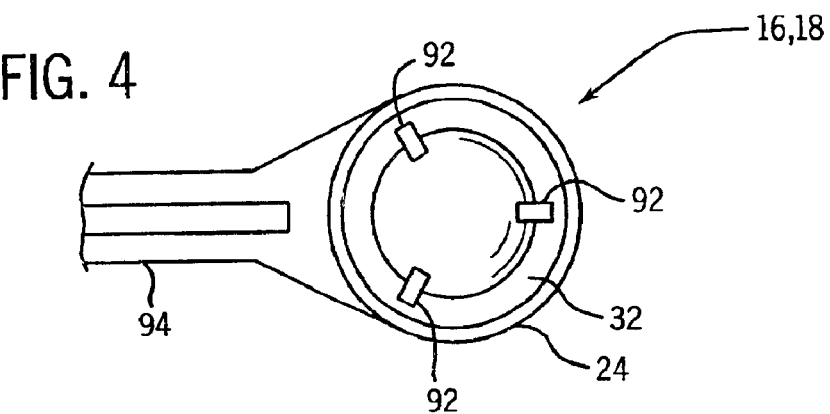
FIG. 4 is a face view of the molded-in-place joint assembly illustrating gaps in the mold material caused by a centering mechanism of the molding assembly illustrated in FIG. 1.

As illustrated in FIG. 3, the molded-in-place joint assembly 16 comprises an integral mold-linkage structure 88 formed by the molding system 10. As illustrated, the integral mold linkage structure 88 includes the substrate assembly 24 molded into and retained by a mold structure 90, which may embody a substantially symmetrical or uniform molded-in-place shell about the ball member 20. As mentioned above, the orientation tabs 40 and the alignment structure 58 ensure that the ball member 20 is centered within the substrate assembly 24 to provide a substantially symmetrical or uniform molded-in-place structure (i.e., the mold structure 90) about the ball member 20. The mold structure 90 also may have gaps caused by the orientation tabs 40 of the injection section 12. In a front view of the molded-in-place joint assembly 16, FIG. 4 illustrates such gaps corresponding to a set of three orientation tabs 92 disposed symmetrically at 120 degrees apart. The molded-in-place joint assembly 16 also may have a lateral linkage member 94 coupled to the threaded stud 22, as illustrated in FIG. 4. However, as discussed above, the studded ball 18 may have any desired connection mechanism and ball joint geometry. The substrate assembly 24 and retention mechanism for the mold structure 90 also may vary depending on the desired application and the type of joint member, which may be a ball, a pin, a bearing assembly, or any other desired structure.

The mold structure 90 also may comprise one or more materials, which are molded onto the ball member 20 as a composite mold or as a multi-layered mold. For example, the mold structure 90 may be formed in multiple molding steps, which progressively build layers of low friction materials, heat resistant materials, corrosion resistant materials, impermeable materials, durable materials, and various other functional material layers. The final mold layer would then secure, or self-retain, the ball member 20 within the substrate assembly 24.

Figure 5:
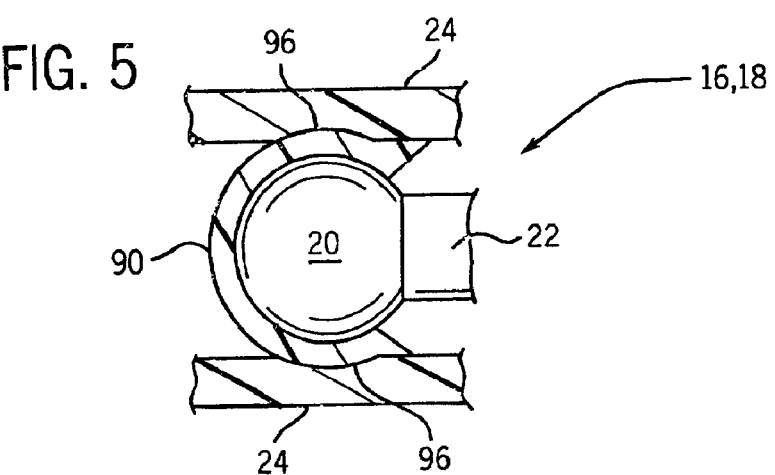
FIG. 5 is a cross-sectional view of the molded-in-place joint assembly having an internal retention feature for the mold material.
Figure 6:
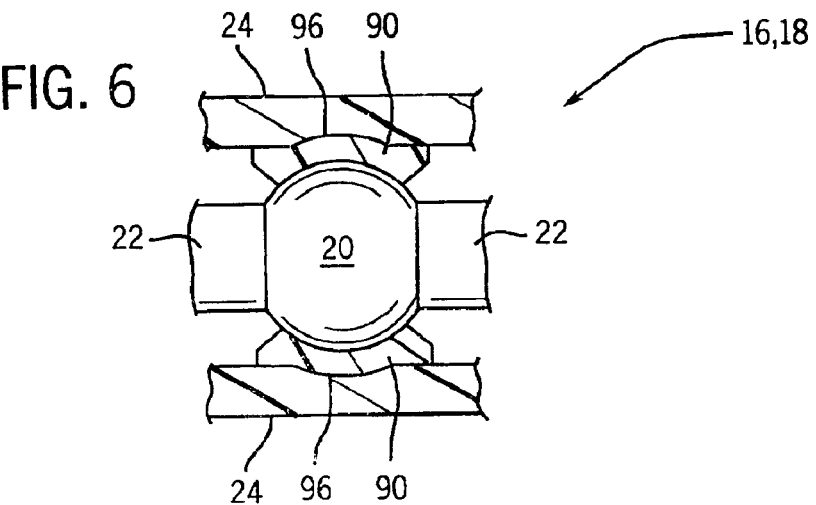
FIG. 6 is a cross-sectional view of the molded-in-place joint assembly having the internal retention feature and a double ended joint structure.

In the embodiment illustrated in FIGS. 1, 3 and 4, the molded-in-place joint assembly 16 has retention structures 32 and 56 disposed at outer edges 36 and 52 of the substrate assembly 24. Alternate embodiments are illustrated in FIGS. 5 and 6. As illustrated in FIGS. 5 and 6, the substrate assembly 24 includes an internal retention cavity 96 for securing the mold structure 90 in place relative to the substrate assembly 24. Any suitable geometry may be utilized for this internal retention cavity 96. As illustrated in FIG. 6, the molded-in-place joint assembly 16 also may be formed from a double-ended studded ball 18. For example, the studded ball 18 may have threaded studs 22 on opposite sides of the ball member 20. Accordingly, the injection and securement sections 12 and 14 may be modified to accommodate the extra threaded stud 22. For example, the securement section 14 illustrated in FIG. 1 may be used for both threaded studs 22 illustrated in FIG. 6, while an injection section may be incorporated into one of the securement sections 14 or into the substrate assembly 24. In either case, the mold structure 90 is molded-in-place about the ball member 20 to form the molded-in-place joint assembly 16.

Figure 7:
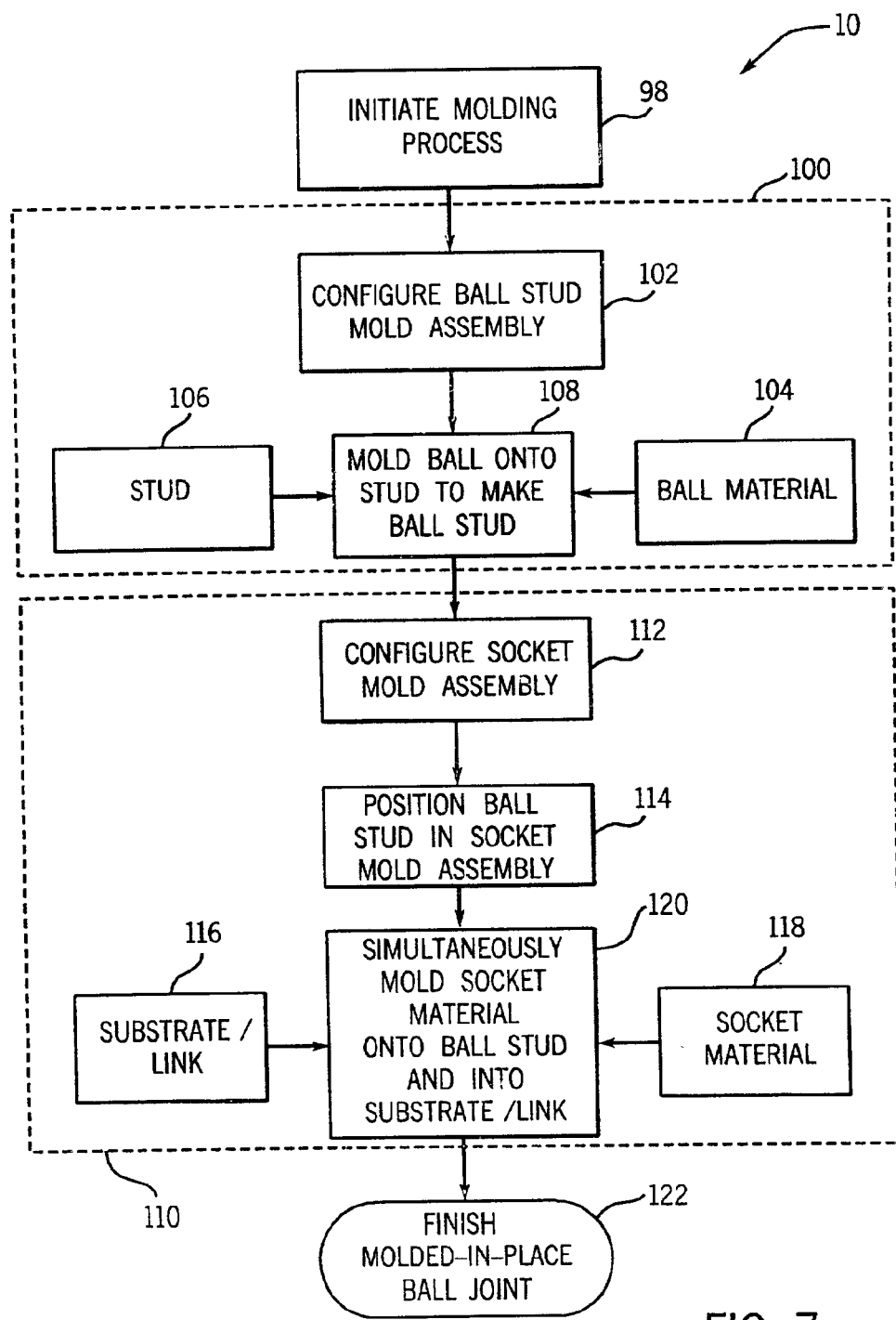
FIG. 7 is a flow chart of an exemplary molding process illustrating formation of the joint structure and the molded-in-place joint assembly.

The molding system 10 is further illustrated with reference to FIG. 7, which is a flow chart illustrating manufacturing of the molded-in-place joint assembly 16 according to certain aspects of the present technique. As illustrated, the molding process is initiated (block 98) to form the molded-in-place joint assembly 16 in an essentially two-step process comprising formation of a ball stud and formation of the molded-in-place ball joint. In process 100, the molding system 10 proceeds to configure a ball stud mold assembly (block 102), which is then used to mold a ball material 104 onto a stud 106 to form a ball stud (block 108). The stud 106 may comprise any desired material and linkage structure, such as a metallic threaded stud. Similarly, the ball material 104 may comprise any desired material, such as a metal, a ceramic, a plastic, or any other suitable material or combination of materials. The ball stud mold assembly may be configured to make a spherical ball, a multi-surfaced ball, an oval ball, an elongated ball or pin, a dimpled texture, or any other desired structure. Accordingly, the molding system 10 then proceeds with process 110 to form the molded-in-place ball joint. The process 110 may proceed similar to the process illustrated in FIG. 2. As illustrated, the process 110 proceeds by configuring a socket mold assembly (block 112), such as the injection and securement sections 12 and 14 illustrated in FIG. 1. The ball stud is then positioned into the socket mold assembly (block 114). A substrate/link 116 and a socket material 118 are also provided for molding with the ball stud. The process 110 then proceeds by simultaneously molding the socket material onto the ball stud and into the substrate/link (block 120). The socket mold assembly is then separated to obtain a molded-in-place ball joint (block 122).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of forming a mechanical joint, comprising:
   providing a studded ball having a ball molded about a stud; and
   over-molding the studded ball movably within a desired structure to form the mechanical joint, wherein the studded ball is configured for coupling to a desired mechanical linkage, wherein over-molding comprises providing a desired mold layer about the studded ball, wherein providing the desired mold layer comprises positioning a spring loaded mold assembly about opposite open portions of the desired structure.

2. The method of claim 1, wherein over-molding comprises molding in place the studded ball in the desired structure.

3. The method of claim 1, wherein over-molding comprises self-retaining the studded ball within the desired structure.

4. The method of claim 3, wherein self-retaining comprises injecting mold material into a ball socket about the studded ball.

5. The method of claim 1, wherein over-molding comprises self-tolerancing the studded ball within mold material disposed about the studded ball.

6. The method of claim 5, wherein self-tolerancing comprises reducing mold contraction about, and fixation to, the studded ball.

7. A method of forming a mechanical joint, comprising:
   molding a ball about a stud to form a studded ball; and
   over-molding the studded ball movably within a desired structure to form the mechanical joint, wherein over-molding comprises creating a temperature differential in which the studded ball is hotter than the desired structure, wherein creating the temperature differential comprises cooling the desired structure.

8. The method of claim 7, wherein creating the temperature differential comprises heating the studded ball.

9. A method of forming a mechanical joint, comprising:
   molding a ball about a stud to form a studded ball; and
   over-molding the studded ball movably within a desired structure to form the mechanical joint, wherein over-molding comprises creating a temperature differential in which the studded ball is hotter than the desired structure, wherein creating the temperature differential comprises solidifying mold material from the desired structure inwardly to the studded ball.

10. The method of claim 1, wherein providing the desired mold layer comprises symmetrically positioning the studded ball within the desired structure.

11. The method of claim 1, wherein positioning the spring-loaded mold assembly comprises abutting centering structures against the studded ball and the desired structure.

12. A method of forming a mechanical joint, comprising:
    providing a studded ball having a ball molded about a stud, wherein the studded ball is configured for coupling to a desired mechanical linkage; and
    over-molding the studded ball movably within a desired structure to form the mechanical joint, wherein over-molding comprises centering the studded ball within the desired structure, wherein centering comprises abutting first and second centering portions of first and second mold structures against the desired structure and the studded ball, respectively, wherein abutting the first centering portion comprises disposing a mold injection nozzle sealingly against a first open portion of the desired structure.

13. The method of claim 1, wherein over-molding comprises injecting mold material and simultaneously pressuring the studded ball against a centering structure to center the studded ball within the desired structure.

14. The method of claim 13, wherein injecting mold material and simultaneously pressuring comprises sealing the studded ball against the centering structure.

15. A method of forming a mechanical joint, comprising:
    providing a studded ball having a ball molded about a stud, wherein the studded ball is configured for coupling to a desired mechanical linkage; and
    over-molding the studded ball movably within a desired structure to form the mechanical joint, wherein over-molding comprises centering the studded ball within the desired structure, wherein centering comprises abutting first and second centering portions of first and second mold structures against the desired structure and the studded ball, respectively, wherein over-molding comprises retracting at least one of the first and second centering portions prior to solidification of the mold material.

16. The method of claim 1, wherein over-molding comprises forming a plurality of molded in place layers about the studded ball.

17. The method of claim 16, wherein forming the plurality of molded in place layers comprises forming at least one low friction layer adjacent the studded ball.

18. The method of claim 1, comprising molding the ball onto the stud to form the studded ball.

19. A molding method for a mechanical joint, comprising:
    providing a studded ball having a ball molded about a stud;

injecting mold material into a cavity between the studded ball and a support structure for the studded ball;

substantially centering the studded ball within the support structure, wherein substantially centering comprises abutting first and second centering portions of a symmetrical mold assembly against the support structure and the studded ball, respectively, wherein injecting comprises injecting mold material into the cavity adjacent the first centering portion and simultaneously forcing the studded ball against the second centering portion via fluid pressure of the injected mold material; and self-tolerancing the studded ball movably within the mold material.

20. The molding method of claim 19, wherein simultaneously forcing the studded ball comprises fluidly sealing the studded ball against the second centering portion.

21. The molding method of claim 19, wherein injecting comprises automatically retaining the studded ball within the support structure.

22. The molding method of claim 21, wherein automatically retaining comprises solidifying mold material about the studded ball and into a socket in the support structure.

23. A molding method for a mechanical joint, comprising:
providing a studded ball having a ball molded about a stud;
injecting mold material into a cavity between the studded ball and a support structure for the studded ball;
substantially centering the studded ball within the support structure; and
self-tolerancing the studded ball movably within the mold material, wherein self-tolerancing comprises facilitating heat transfer between the studded bail and the support structure via a temperature differential in which the support structure is cooler than the studded ball.

24. The molding method of claim 31, wherein facilitating heat transfer comprises cooling the mold material inwardly from the support structure to the studded ball.

25. A molding method for a mechanical joint, comprising:
providing a studded ball having a ball molded about a stud;
injecting mold material into a cavity between the studded ball and a support structure for the studded ball;
substantially centering the studded ball within the support structure; and
self-tolerancing the studded ball movably within the mold material, wherein injecting mold material comprises molding in place the studded ball in the support structure.

26. A molding method for a mechanical joint, comprising:
providing a studded ball having a ball molded about a stud;
injecting mold material into a cavity between the studded ball and a support structure for the studded ball;
substantially centering the studded ball within the support structure; and
self-tolerancing the studded ball movably within the mold material, wherein injecting mold material comprises fanning at least one molded in place layer having a low friction surface adjacent the studded ball.

27. A method of forming a mechanical joint, comprising:
centering a studded ball having a ball molded about a stud;
independently centering a desired structure relative to the studded ball; and
injecting mold material between the studded ball and the desired structure, wherein centering and independently centering comprise abutting first and second centering structures against the desired structure and the studded ball, respectively, wherein abutting comprises biasing the first and second structures inwardly toward one another.

28. A method of forming a mechanical joint, comprising:
centering a studded ball having a ball molded about a stud;
independently centering a desired structure relative to the studded ball; and
injecting mold material between the studded ball and the desired structure, wherein centering and independently centering comprise abutting first and second centering structures against the desired structure and the studded ball, respectively, wherein abutting comprises:
engaging the first centering structure against the desired structure at a first end of the desired structure; and
contacting the second centering structure against the studded ball adjacent a second end of the desired structure.

29. The method of claim 27, wherein injecting comprises molding comprises molding in place the studded ball in the desired structure.

30. The method of claim 27, comprising positioning a spring-loaded mold structure at an open portion of the desired structure.

31. A method of forming a mechanical joint, comprising:
centering a studded ball having a ball molded about a stud;
independently centering a desired structure relative to the studded ball; and
injecting mold material between the studded ball and the desired structure, where injecting mold material comprises pressurably biasing the studded ball toward a centering structure.

32. A method of forming a mechanical joint, comprising:
providing a studded ball in an oversized socket;
creating a temperature differential in which the temperature of the studded ball is greater than the temperature of the socket; and
injecting mold material into the oversized socket about the studded ball.

33. The method of claim 32, wherein creating the temperature differential comprises heating the studded ball.

34. The method of claim 32, wherein creating the temperature differential comprises cooling the oversized socket.

35. The method of claim 32, wherein creating the temperature differential comprises facilitating cooling of the mold material from the oversized socket inwardly to the studded ball.

36. The method of claim 32, wherein creating the temperature differential comprises reducing contraction of the mold material onto the studded ball during solidification.

37. The method of claim 1, wherein providing and over-molding comprise molding a plastic ball onto a metallic stud and over-molding a plastic material about the plastic ball movably within the desired structure.

38. The method of claim 1, comprising assembling the mechanical joint into a vehicle.

39. The method of claim 1, comprising assembling the mechanical joint into a suspension system.

40. The method of claim 32, wherein providing and injecting comprise molding a plastic ball onto a metallic stud and over-molding a plastic material about the plastic ball movably within the desired structure.

41. The method of claim 32, comprising assembling the mechanical joint into a vehicle.

42. The method of claim 32, comprising assembling the mechanical joint into a suspension system.

* * * * *